S. W. GEAR.
Clamp for Wheel.

No. 212,549. Patented Feb. 25, 1879.

WITNESSES
F. F. Raymond
A. J. Oettinger

Samuel W. Gear INVENTOR

UNITED STATES PATENT OFFICE.

SAMUEL W. GEAR, OF CAMBRIDGE, MASSACHUSETTS, ASSIGNOR OF ONE-HALF HIS RIGHT TO EDWARD H. WHITNEY; SAID GEAR AND WHITNEY ASSIGNORS TO DOVER STAMPING COMPANY.

IMPROVEMENT IN CLAMPS FOR WHEELS.

Specification forming part of Letters Patent No. 212,549, dated February 25, 1879; application filed July 29, 1878.

*To all whom it may concern:*

Be it known that I, SAMUEL W. GEAR, of Cambridge, in the county of Middlesex and Commonwealth of Massachusetts, have invented an Improvement in Clamping-Plates for Emery and other Wheels, of which the following is a specification:

This invention has for its object a clamping-plate for emery and other wheels, consisting in a convex sheet-metal disk having radial corrugations extending from or near a central hole to the edge, as hereinafter described.

The clamping-plate is to be used substantially in the manner indicated in Patent No. 201,949, granted to A. Q. Robinson, April 21, 1878, with the exception that, in lieu of each plate having a series of jaws, a separate plate for each jaw will be employed.

Figure 1:
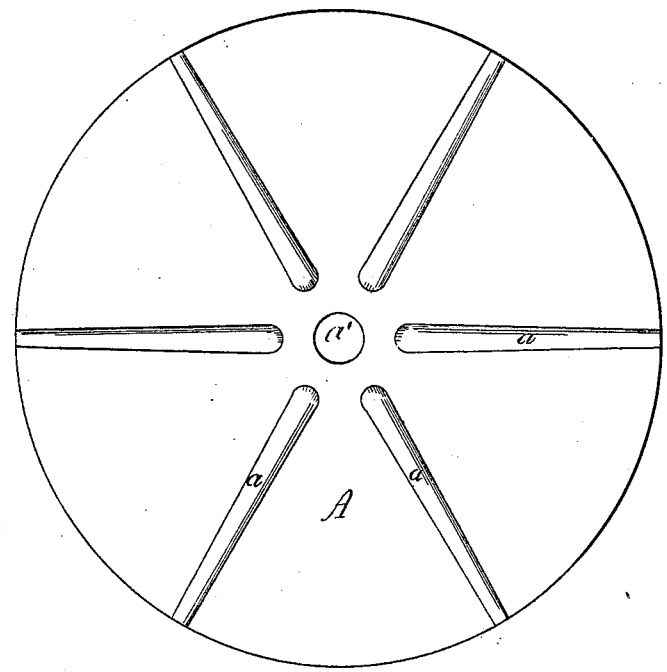
Figure 2:
Figure 3:
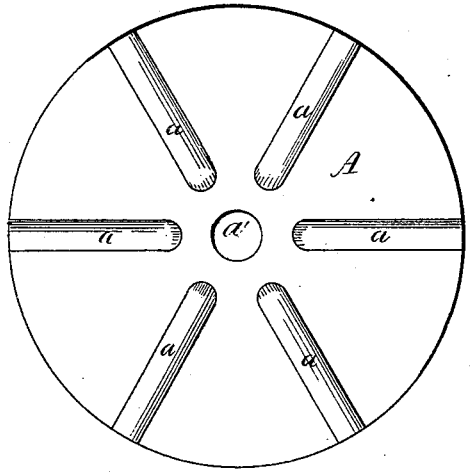
Figure 4:

In the drawings, Figures 1 and 3 are plans of my improved clamping-plate, and Figs. 2 and 4 are cross-sections thereof.

A represents a convex disk, provided with radial corrugations $a$, which extend from the central hole, $a$ 1. These corrugations may be of any desired depth and width, and in the larger disk it may be desirable to make them broader and deeper, or both, at or near the central hole, and to taper them in depth or width gradually toward the edge.

I use, in shaping the disk, dies of the shape ordinarily employed in concaving, with the exception that the male die is provided with radial corrugations which fit or close into corresponding radial depressions in the female die.

The metal plate is first punched to the desired shape from the sheet metal either with the central hole, $a$ 1, as shown in Fig. 1, or without it, as shown in Fig. 2, and is then operated upon by the molding-dies, which raise the radial corrugations upon the convex side of the disk.

By this construction very thick sheet metal can be provided with a convex form; or, if thin sheet metal is used, it is so strengthened as to possess the advantages of a thicker sheet. It is desirable that the corrugations be upon the convex or outer side of the plate, in order that the edge of the plate may have a continuous bearing upon the side of the wheel.

It will be observed that this construction gives elasticity to a disk, which is a very desirable property for clamping-plates.

Having thus fully described my invention, I claim and desire to secure by Letters Patent of the United States—

The within-described elastic clamping-plate for emery and other grinding wheels, consisting of the convex metal disk A, provided with radial corrugations extending from near the central hole, $a$ 1, to the edge of the disk, substantially as and for the purposes described.

SAMUEL W. GEAR.

Witnesses:
F. F. RAYMOND, 2d,
A. J. OETTINGER.